(12) United States Patent
Kim

(10) Patent No.: US 11,718,219 B2
(45) Date of Patent: Aug. 8, 2023

(54) CONTROL APPARATUS OF LAMP AND OPERATING METHOD OF THE SAME, AND VEHICLE

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/736,265

(22) Filed: May 4, 2022

(65) Prior Publication Data

US 2023/0001848 A1    Jan. 5, 2023

(30) Foreign Application Priority Data

Jun. 30, 2021  (KR) .................. 10-2021-0086003

(51) Int. Cl.
*B60Q 1/115*   (2006.01)
*F21S 41/657*  (2018.01)

(52) U.S. Cl.
CPC ............ *B60Q 1/115* (2013.01); *F21S 41/657* (2018.01); *B60Q 2300/132* (2013.01); *B60Q 2300/324* (2013.01)

(58) Field of Classification Search
CPC ..................... B60Q 1/115; B60Q 2300/324
See application file for complete search history.

(56) References Cited

U.S. PATENT DOCUMENTS

| 6,459,476 B2* | 10/2002 | Nishimura | ............ G01S 7/4813 356/5.01 |
| 6,480,806 B1* | 11/2002 | Bilz | ....................... B60Q 1/115 362/465 |
| 2012/0069593 A1* | 3/2012 | Kishimoto | ............. B60Q 1/076 362/280 |

* cited by examiner

*Primary Examiner* — Robert J May
(74) *Attorney, Agent, or Firm* — NovoTechIP International PLLC

(57) ABSTRACT

Disclosed is a lamp control apparatus according to an embodiment of the present disclosure, which includes information acquirer that acquires information on a sensor of a vehicle and acquires distance information between the sensor and a ground from the sensor, and a controller that calculates a slope of the vehicle based on the information on the sensor and the distance information between the sensor and the ground and generates a control signal for controlling a lamp of the vehicle based on the calculated slope of the vehicle.

14 Claims, 8 Drawing Sheets

CONTROL APPARATUS OF LAMP AND OPERATING METHOD OF THE SAME, AND VEHICLE

CROSS-REFERENCE TO RELATED APPLICATIONS

This application claims the benefit of priority to Korean Patent Application No. 10-2021-0086003, filed in the Korean Intellectual Property Office on Jun. 30, 2021, the entire contents of which are incorporated herein by reference.

BACKGROUND

1. Technical Field

The present disclosure relates to a control apparatus of a lamp and an operating method of the same, and a vehicle including the same.

2. Discussion of Related Art

In general, headlamps of a vehicle are used to secure a front view stably when driving at night or in dark tunnels, fog, or rain conditions.

Recently, as the use of high-resolution LEDs is expanded, the high-resolution LEDs are also being used in the headlamps of a vehicle. Accordingly, technologies and applications for projecting images on a road surface using the headlamps of a vehicle are being developed.

To use the headlamps with various functions, it is important to set an irradiation angle. When the irradiation angle of the headlamp is set high, the headlamp may not provide a necessary function to a user. When the vehicle is tilted, the headlamp performs irradiation at an angle higher or lower than the previously set irradiation angle. Therefore, it is important for the vehicle to calculate the degree of slope of the vehicle so as to properly adjust the irradiation angle of the headlamp.

SUMMARY

The present disclosure has been made to solve the above-mentioned problems occurring in the prior art while advantages achieved by the prior art are maintained intact.

An aspect of the present disclosure provides a lamp control apparatus capable of leveling a lamp by calculating a slope of a vehicle based on information obtained from a sensor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp control apparatus includes information acquirer configured to acquire or receive information on a sensor of a vehicle and acquires distance information between the sensor and a ground from the sensor, and a controller configured to calculate a slope of the vehicle based on the information on the sensor and the distance information between the sensor and the ground and to generate a control signal for controlling a lamp of the vehicle based on the calculated slope of the vehicle.

According to an embodiment, the information on the sensor may include position information of the sensor and reference irradiation angle information regarding an irradiation angle of the sensor in a state in which the vehicle is horizontal to the ground.

According to an embodiment, the controller may calculate the irradiation angle of the sensor based on the position information of the sensor and the distance information between the sensor and the ground.

According to an embodiment, the controller may compare the reference irradiation angle information with the calculated irradiation angle of the sensor to calculate the slope of the vehicle.

According to an embodiment, the controller may generate the control signal for controlling the lamp to correct the irradiation angle of the lamp by the calculated slope of the vehicle.

According to an embodiment, the lamp may include a first lamp and a second lamp, and the sensor may include a first sensor attached to the first lamp and a second sensor attached to the second lamp.

According to an embodiment, the controller may calculate a first slope based on information on the first sensor and distance information between the first sensor and the ground, and may calculate a second slope based on information on the second sensor and distance information between the second sensor and the ground.

According to an embodiment, the controller may generate a first control signal and a second control signal for controlling the first lamp and the second lamp, respectively, based on the calculated first slope and second slope.

According to an embodiment, an irradiation angle of the sensor may be different from an irradiation angle of the lamp.

According to an aspect of the present disclosure, a method of operating a lamp control apparatus includes acquiring distance information between a sensor and a ground from the sensor of a vehicle, acquiring information on the sensor, calculating a slope of the vehicle based on the information on the sensor and the distance information between the sensor and the ground, and generating a control signal for controlling a lamp of the vehicle based on the calculated slope of the vehicle.

According to an embodiment, the information on the sensor may include position information of the sensor and reference irradiation angle information regarding an irradiation angle of the sensor in a state in which the vehicle is horizontal to the ground.

According to an embodiment, the calculating of the slope of the vehicle based on the information on the sensor and the distance information between the sensor and the ground may include calculating the irradiation angle of the sensor based on the information on the sensor and the distance information between the sensor and the ground, and comparing the reference irradiation angle information with the calculated irradiation angle of the sensor to calculate the slope of the vehicle.

According to an embodiment, the generating of the control signal for controlling the lamp of the vehicle based on the calculated slope of the vehicle may include generating the control signal for controlling the lamp to correct the irradiation angle of the lamp by the calculated slope of the vehicle.

According to an embodiment, the lamp may include a first lamp and a second lamp, and the sensor may include a first sensor attached to the first lamp and a second sensor attached to the second lamp.

According to an embodiment, the calculating of the slope of the vehicle based on the information on the sensor and the distance information between the sensor and the ground may include calculating a first slope based on information on the first sensor and distance information between the first sensor and the ground, and calculating a second slope based on information on the second sensor and distance information between the second sensor and the ground.

According to an embodiment, the generating of the control signal for controlling the lamp of the vehicle based on the calculated slope of the vehicle may include generating a first control signal and a second control signal for controlling the first lamp and the second lamp, respectively, based on the calculated first slope and second slope.

According to an aspect of the present disclosure, a vehicle includes a lamp, a sensor attached to the lamp, and a lamp control apparatus that acquires distance information between the sensor and a ground from the sensor, acquires information on the sensor, calculates a slope of the vehicle based on the information on the sensor and the distance information between the sensor and the ground, and generates a control signal for controlling a lamp of the vehicle based on the calculated slope of the vehicle.

According to an embodiment, the lamp may include a first lamp and a second lamp, and the sensor may include a first sensor attached to the first lamp and a second sensor attached to the second lamp.

According to an embodiment, the first sensor may irradiate rays in a direction different from an irradiation angle of the first lamp, and the second sensor may irradiate rays in a direction different from an irradiation angle of the second lamp.

According to an embodiment, the lamp control apparatus may calculate a first slope with respect to the first sensor, and generate a first control signal for controlling the first lamp based on the calculated first slope, and may calculate a second slope with respect to the second sensor, and generate a second control signal for controlling the second lamp based on the calculated second slope.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
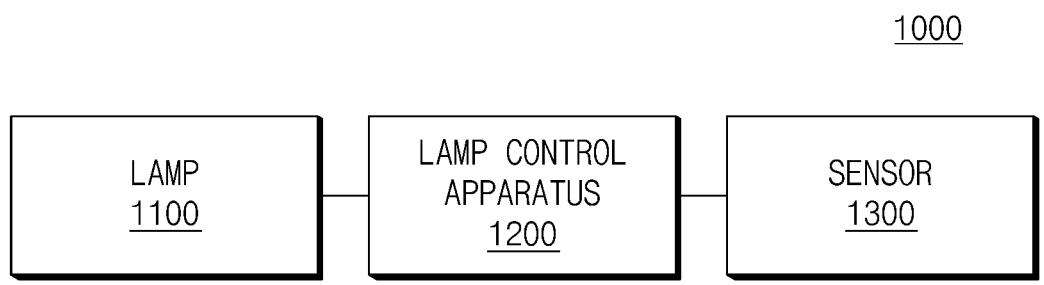
FIG. 1 is a block diagram illustrating a vehicle, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A," "B," (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle, according to an embodiment of the present disclosure.

Referring to FIG. 1, a vehicle 1000 according to an embodiment of the present disclosure may include a lamp 1100, a lamp control apparatus 1200, and a sensor 1300.

The lamp 1100 may include a headlamp of the vehicle 1000. For example, the lamp 1100 may include a digital mirror device (DMD) or an LED array.

The sensor 1300 may measure a distance between the vehicle and a target object. For example, the sensor 1300 may measure a distance between the sensor 1300 and a ground. In an embodiment, the sensor 1300 may include a sensor capable of measuring a distance. For example, the sensor 1300 may include at least one of an infrared sensor, an ultrasonic sensor, a time of flight (ToF) sensor, a radar sensor, and a lidar sensor.

In an embodiment, the sensor 1300 may include an infrared sensor (an IR sensor), and the infrared sensor may include an LED (a light emitting part) that generates infrared and a light sensor (a light receiving part) that detects infrared, and may measure a distance between a target object and the infrared sensor based on a voltage that is changed depending on an amount of infrared rays incident on the light receiving part after infrared rays irradiated from the light emitting part are reflected by the target object.

The lamp control apparatus 1200 may acquire or receive distance information between the sensor 1300 and the ground from the sensor 1300. For example, the sensor 1300 may measure a distance between the ground and the sensor 1300, and may transfer the measured distance information to the lamp control apparatus 1200.

The lamp control apparatus 1200 may acquire or receive information on the sensor 1300. For example, the information on the sensor 1300 may include position information of the sensor 1300 and reference irradiation angle information regarding an irradiation angle of the sensor 1300 in a state in which the vehicle 1000 is horizontal to the ground. In an embodiment, the lamp control apparatus 1200 may acquire or receive information on the sensor 1300 in advance before driving of the vehicle 1000, or may acquire or receive the information on the sensor 1300 from another device inside or outside the vehicle 1000.

The lamp control apparatus 1200 may calculate a slope of the vehicle 1000 based on the obtained information on the sensor 1300 and the distance information between the sensor 1300 and the ground. The lamp control apparatus 1200 may generate a control signal for controlling the lamp 1100 of the vehicle 1000 based on the calculated slope of the vehicle 1000. For example, when the vehicle 1000 is tilted, since the lamp 1100 irradiates light in a direction different from the previously set irradiation angle, the lamp control apparatus 1200 may generate a control signal for controlling the lamp 1100 to correct an irradiation angle of the lamp 1100 based on the slope of the vehicle 1000.

The vehicle 1000 according to an embodiment of the present disclosure may allow the lamp 1100 to radiate light normally through the operation of the lamp control apparatus 1200 even when the vehicle 1000 is tilted.

Figure 2:
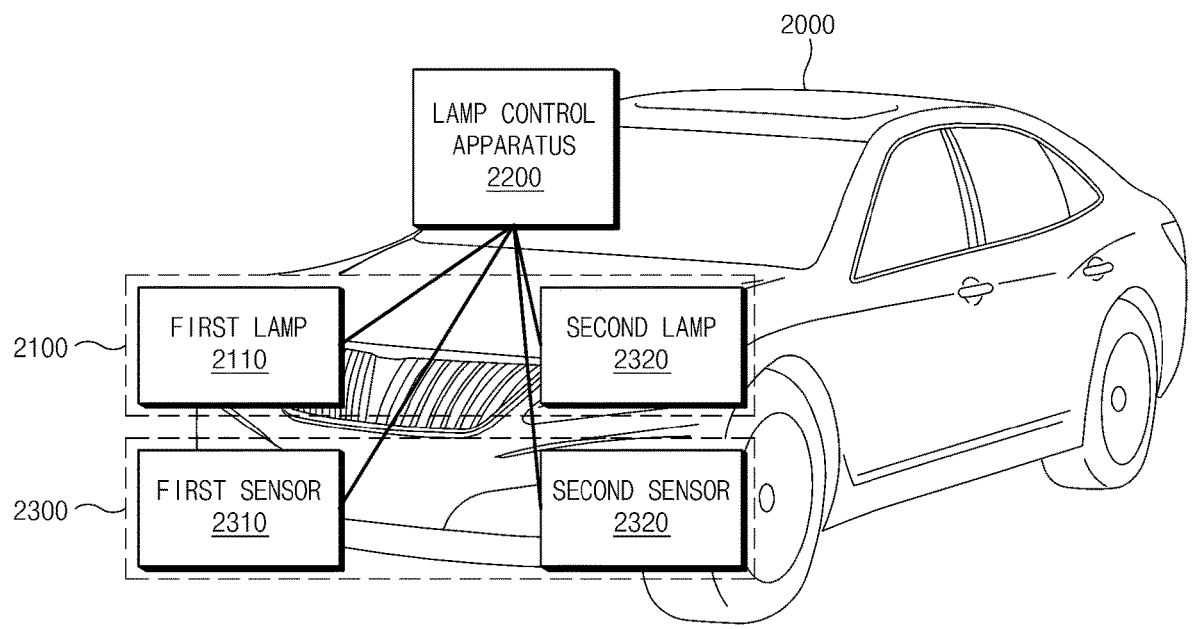
FIG. 2 is a diagram illustrating a vehicle, according to another embodiment of the present disclosure.

FIG. 2 is a diagram illustrating a vehicle, according to another embodiment of the present disclosure.

Referring to FIG. 2, a vehicle 2000 according to another embodiment of the present disclosure may include a lamp 2100, a lamp control apparatus 2200, and a sensor 2300.

The lamp 2100 may include a first lamp 2110 and a second lamp 2120. For example, the first lamp 2110 may be a right headlamp of the vehicle 2000, and the second lamp 2120 may be a left headlamp of the vehicle 2000. In an embodiment, the first lamp 2110 and the second lamp 2120 may be actually the same as the lamp 1100 of FIG. 1.

The sensor 2300 may include a first sensor 2310 and a second sensor 2320. For example, the first sensor 2310 may be coupled or attached to the first lamp 2110 of the vehicle 2000, and the second sensor 2320 may be coupled or attached to the second lamp 2120 of the vehicle 2000.

The first sensor 2310 and the second sensor 2320 may measure a distance between the first sensor 2310 and the ground, and a distance between the second sensor 2320 and the ground, respectively, and may transfer the measured distance information to the lamp control apparatus 2200. In an embodiment, the first sensor 2310 and the second sensor 2320 may be actually the same as the sensor 1300 of FIG. 1.

The lamp control apparatus 2200 may calculate a first slope of the vehicle 2000 based on the information on the first sensor 2310 and the distance information between the ground and the first sensor 2310 that is measured from the first sensor 2310. The lamp control apparatus 2200 may generate a first control signal for controlling the first lamp 2110 based on the first slope of the vehicle 2000.

The lamp control apparatus 2200 may calculate a second slope of the vehicle 2000 based on the information on the second sensor 2320 and the distance information between the ground and the second sensor 2320 that is measured from the second sensor 2320. The lamp control apparatus 2200 may generate a second control signal for controlling the second lamp 2120 based on the second slope of the vehicle 2000.

The lamp control apparatus 2200 may correct separately irradiation angles of the first lamp 2110 and the second lamp 2120 by generating the first control signal and the second control signal with respect to each of the first lamp 2110 and the second lamp 2120.

In an embodiment, the first sensor 2310 may irradiate rays in a direction different from the irradiation angle of the first lamp 2110. For example, when the irradiation angles of the first sensor 2310 and the first lamp 2110 are the same, and when the vehicle 2000 is tilted and the first lamp 2110 is raised, since the first sensor 2310 is also upwardly raised, it may not be possible to measure the distance to the ground. Accordingly, the first sensor 2310 may need to be set to irradiate in a direction different from the irradiation angle of the first lamp 2110. In an embodiment, the second sensor 2320 may irradiate rays in a direction different from the irradiation angle of the second lamp 2120. For example, when the irradiation angles of the second sensor 2320 and the second lamp 2120 are the same, and when the vehicle 2000 is tilted and the second lamp 2120 is raised, since the second sensor 2320 is also upwardly raised, it may not be possible to measure the distance to the ground. Accordingly, the second sensor 2320 may need to be set to irradiate in a direction different from the irradiation angle of the second lamp 2120.

Figure 3:
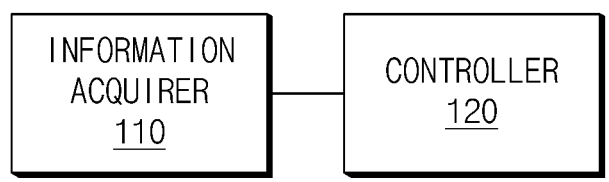
FIG. 3 is a block diagram illustrating a lamp control apparatus, according to an embodiment of the present disclosure.

FIG. 3 is a block diagram illustrating a lamp control apparatus, according to an embodiment of the present disclosure.

Referring to FIG. 3, a lamp control apparatus 100 according to an embodiment of the present disclosure may include an information acquirer 110 and a controller 120. In an embodiment, the lamp control apparatus 100 may be actually the same as the lamp control apparatus 1200 of FIG. 1 and the lamp control apparatus 2200 of FIG. 2.

The information acquirer 110 may acquire information on a sensor of the vehicle. For example, the information on the sensor may include position information of the sensor and reference irradiation angle information regarding an irradiation angle of the sensor in a state in which the vehicle is horizontal to the ground. In this case, the position information of the sensor may include information on a height at which the sensor is installed from the ground.

The information acquirer 110 may acquire distance information between the sensor and the ground from the sensor. For example, the information acquirer 110 may acquire, from the sensor, distance information between the sensor and the ground measured by the sensor. According to an embodiment, the distance between the sensor and the ground may be a value that varies depending on a degree of a slope of the vehicle.

The controller 120 may calculate the slope of the vehicle based on the information obtained from the information acquirer 110. For example, the controller 120 may calculate the slope of the vehicle based on the information on the sensor and the distance information between the sensor and the ground. The controller 120 may calculate an irradiation angle of the sensor based on the position information of the sensor and the distance information between the sensor and the ground. Also, the controller 120 may calculate the slope of the vehicle by comparing the reference irradiation angle information with the calculated irradiation angle of the sensor.

Figure 4:
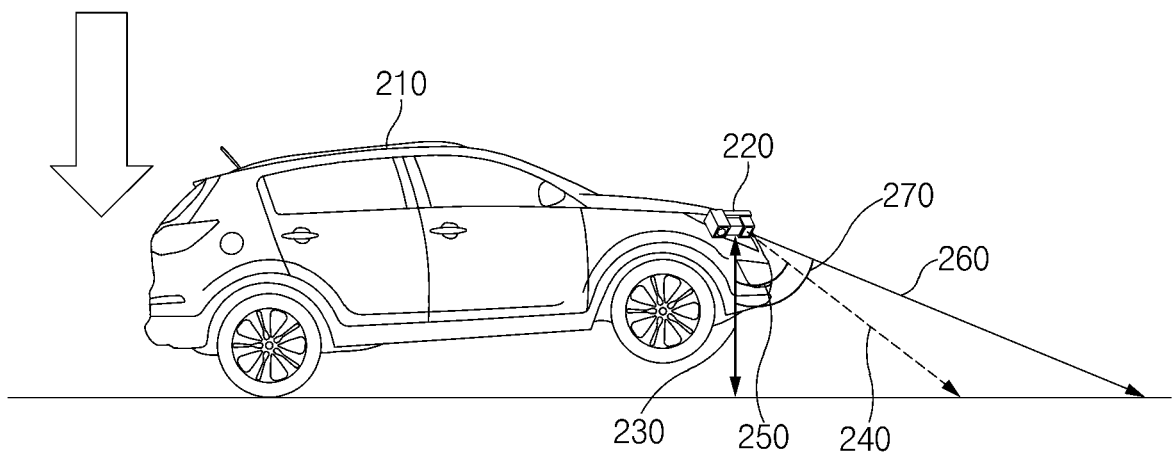
FIG. 4 is a diagram illustrating how a lamp control apparatus according to an embodiment of the present disclosure calculates a slope of a vehicle.

FIG. 4 is a diagram illustrating how a lamp control apparatus according to an embodiment of the present disclosure calculates a slope of a vehicle.

Referring to FIG. 4, when a weight is applied or pressed to a rear side of a vehicle 210, a slope of the vehicle 210 may change. The controller 120 may acquire position information 230 of a sensor 220 from the information acquirer 110, and may acquire irradiation direction information 240 of the sensor or reference irradiation angle information 250 in a state in which the vehicle 210 is horizontal to the ground. Also, the controller 120 may acquire distance information 260 between the sensor 220 and the ground that is measured by the sensor 220 from the information acquirer 110. The controller 120 may calculate an irradiation angle 270 of the sensor 220 based on the distance information 260 between the sensor 220 and the ground and the position information 230 of the sensor 220. For example, the controller 120 may calculate the irradiation angle 270 of the sensor 220 based on a trigonometric function.

The controller 120 may compare the calculated irradiation angle 270 of the sensor 220 with the reference irradiation angle information 250 regarding the irradiation angle of the sensor 220 in a state in which the vehicle 210 is horizontal to the ground, and may calculate a slope of the vehicle 210 based on the comparison result. For example, the controller 120 may calculate a difference between the calculated irradiation angle 270 of the sensor 220 and the reference irradiation angle information 250 regarding the irradiation angle of the sensor 220 in a state in which the vehicle 210 is horizontal to the ground, and may determine that the calculated difference is the slope of the vehicle 210. In an embodiment, the controller 120 may generate a control signal for controlling the lamp based on the calculated slope of the vehicle 210.

Referring back to FIG. 3, the controller 120 may generate a control signal for controlling the lamp to correct the irradiation angle of the lamp by the calculated slope of the vehicle. For example, the controller 120 may generate a control signal to adjust the irradiation angle of the lamp by the calculated slope of the vehicle. In this case, as the irradiation angle of the lamp is corrected as much as the slope of the vehicle, the lamp may be capable of irradiating light in a direction that coincides with the irradiating direction in a state in which the vehicle is horizontal to the ground.

In an embodiment, the lamp may include a first lamp and a second lamp. For example, the first lamp may be a right lamp of the vehicle, and the second lamp may be a left lamp of the vehicle. Also, the sensor may include a first sensor and a second sensor. For example, the first sensor may be coupled or attached to the first lamp, and the second sensor may be coupled or attached to the second lamp.

The information acquirer 110 may acquire information on the sensor and distance information between the sensor and the ground with respect to each of the first sensor and the second sensor. For example, the information acquirer 110 may acquire information on the first sensor, distance information between the first sensor and the ground, information on the second sensor, and distance information between the second sensor and the ground.

The controller 120 may calculate a slope based on the information obtained by the information acquirer 110 and may generate a control signal for controlling each lamp. For example, the controller 120 may calculate a first slope based on the information on the first sensor and the distance information between the first sensor and the ground, and may calculate a second slope based on the information on the second sensor and the distance information between the second sensor and the ground.

The controller 120 may generate a first control signal and a second control signal for controlling each of the first lamp and the second lamp based on the calculated first and second slopes. For example, the controller 120 may generate the first control signal for controlling the first lamp based on the calculated first slope, and may generate the second control signal for controlling the second lamp based on the calculated second slope. As another example, since the controller 120 calculates a slope and generates a control signal with respect to each of the first lamp and the second lamp, the controller 120 may generate a control signal allowing the first lamp and the second lamp to be leveled differently, respectively. That is, when only the first lamp is raised due to an obstacle and the second lamp is in a normal state, the controller 120 may generate a first control signal for controlling only the first lamp to lower the irradiation angle, and may generate a second control signal for controlling the second lamp to maintain the irradiation angle.

In an embodiment, the irradiation angle of the sensor may be different from the irradiation angle of the lamp. For example, the irradiation angle of the sensor may be set lower than the irradiation angle of the lamp.

Figure 5:
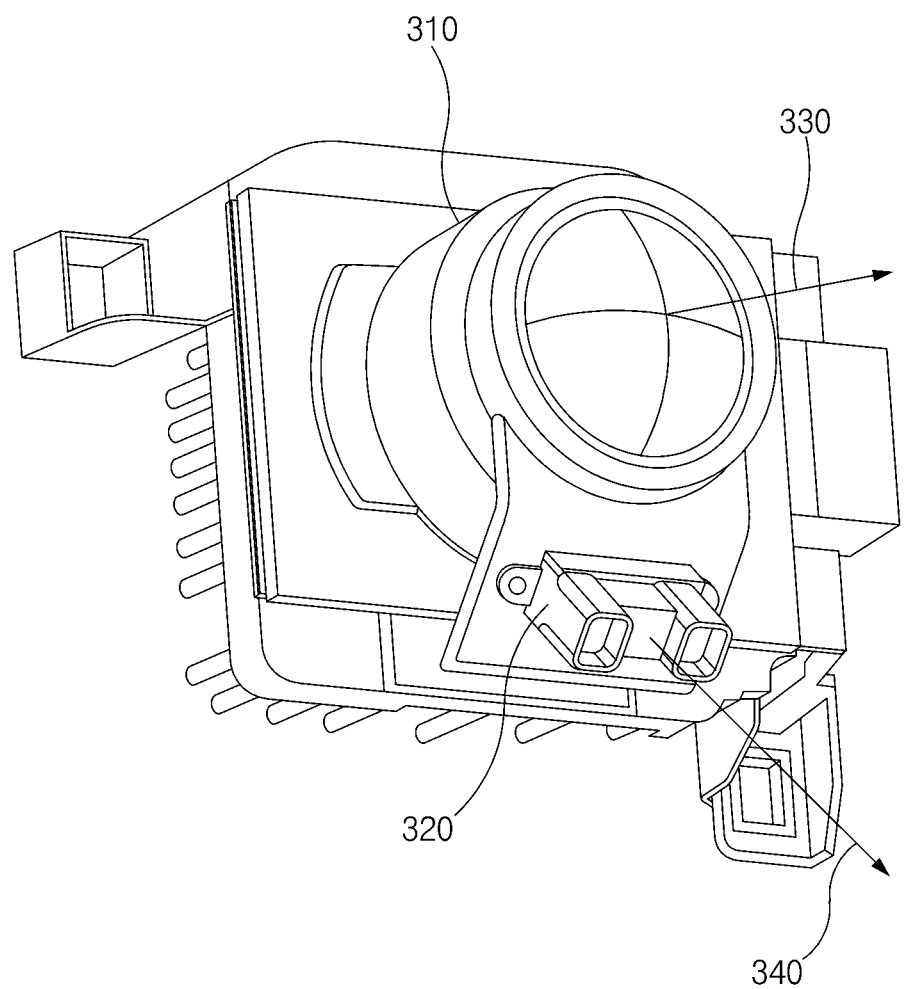
FIG. 5 is a diagram illustrating a lamp and a sensor, according to an embodiment of the present disclosure.

FIG. 5 is a diagram illustrating a lamp and a sensor, according to an embodiment of the present disclosure.

Referring to FIG. 5, an irradiation direction 330 of a lamp 310 may be set differently from an irradiation direction 340 of a sensor 320. For example, when the irradiation direction 330 of the lamp 310 and the irradiation direction 340 of the sensor 320 are set to be the same, there may be a case where the sensor 320 cannot measure the distance between the ground and the sensor 320, and in this case, the controller 120 may not be able to calculate the slope of the vehicle. That is, when the irradiation direction 340 of the sensor 320 is lower than the irradiation direction 330 of the lamp 310, the controller 120 may calculate the slope of the vehicle, and may generate a control signal for controlling the irradiation angle of the lamp based on the calculated slope.

Figure 6:
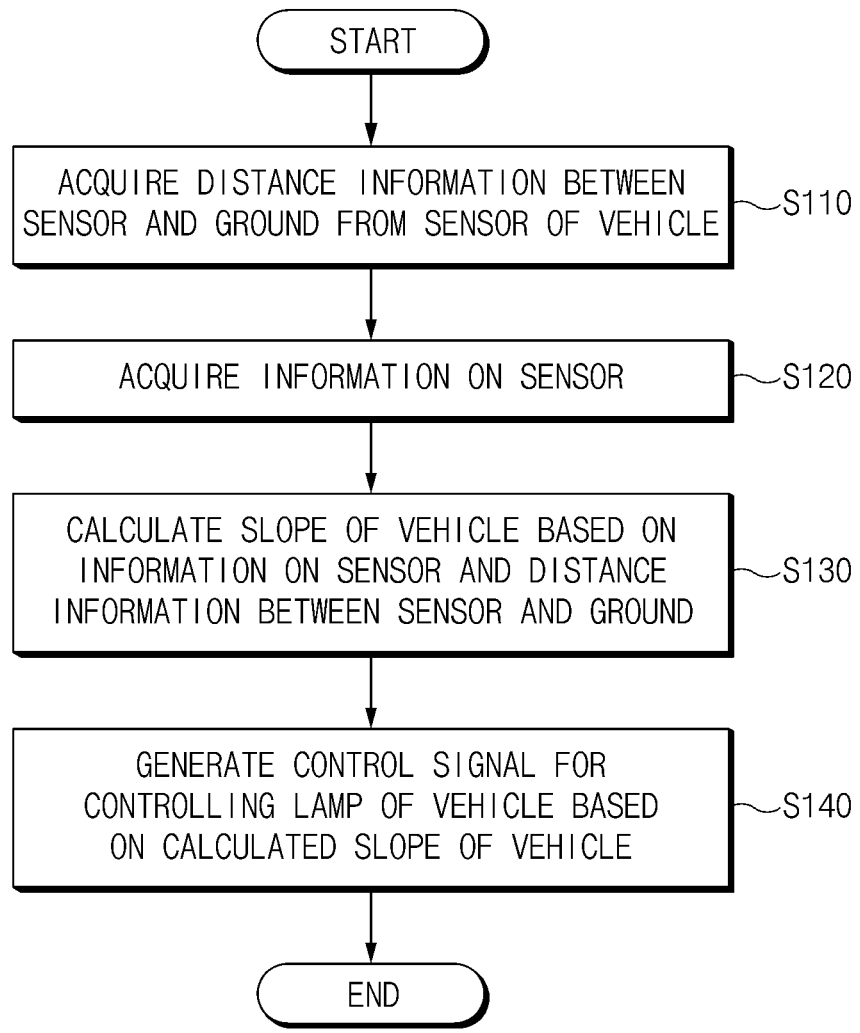
FIG. 6 is a flowchart illustrating a method of operating a lamp control apparatus, according to an embodiment of the present disclosure.

FIG. 6 is a flowchart illustrating a method of operating a lamp control apparatus, according to an embodiment of the present disclosure.

An operation method of the lamp control apparatus 100 according to an embodiment of the present disclosure may include acquiring distance information between the sensor and the ground from a sensor of the vehicle (S110), acquiring information on the sensor (S120), calculating a slope of the vehicle based on the information on the sensor and the distance information between the sensor and the ground (S130), and generating a control signal for controlling the lamp of the vehicle based on the calculated slope of the vehicle (S140). In an embodiment, the method of operating the lamp control apparatus may be performed by the lamp control apparatus 100 of FIG. 3.

In S110 of acquiring the distance information between the sensor and the ground from the sensor of the vehicle, the information acquirer 110 may acquire distance information between the sensor and the ground from the sensor of the vehicle. For example, the sensor may measure the distance between the sensor and the ground, and the information acquirer 110 may acquire the measured distance information.

In S120 of acquiring the information on the sensor, the information acquire 110 may acquire information on the sensor. For example, the information acquirer 110 may acquire the information on the sensor in advance before driving the vehicle, or may acquire information on the sensor from another device inside or outside the vehicle. For example, the information on the sensor may include position information of the sensor and reference irradiation angle information regarding an irradiation angle of the sensor in a state in which the vehicle is horizontal to the ground.

In S130 of calculating the slope of the vehicle based on the information on the sensor and the distance information between the sensor and the ground, the controller 120 may calculate the slope of the vehicle based on the information on the sensor and the distance information between the sensor and the ground, which are acquired from the information acquirer 110. For example, the controller 120 may calculate the slope of the vehicle based on the distance information between the sensor and the ground, the position information of the sensor, and reference irradiation angle information regarding the irradiation angle of the sensor in a state in which the vehicle is horizontal to the ground.

In S140 of generating the control signal for controlling the lamp of the vehicle based on the calculated slope of the vehicle, the controller 120 may generate a control signal for controlling the lamp of the vehicle based on the calculated slope of the vehicle. For example, since there is a possibility that the lamp is raised or lowered when the vehicle is tilted, the controller 120 may generate the control signal for controlling the lamp to correct a degree to which the lamp is raised or lowered.

Figure 7:
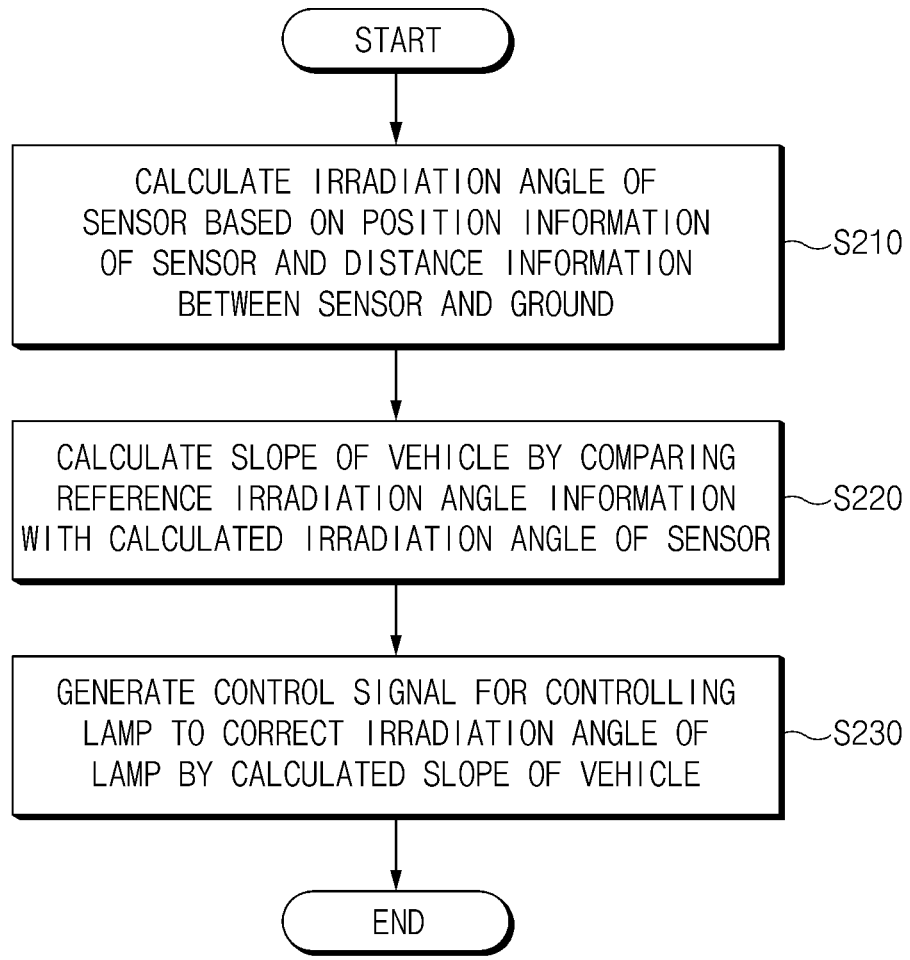
FIGS. 7 and 8 are flowcharts illustrating in more detail a method of operating a lamp control apparatus, according to an embodiment of the present disclosure.
Figure 8:
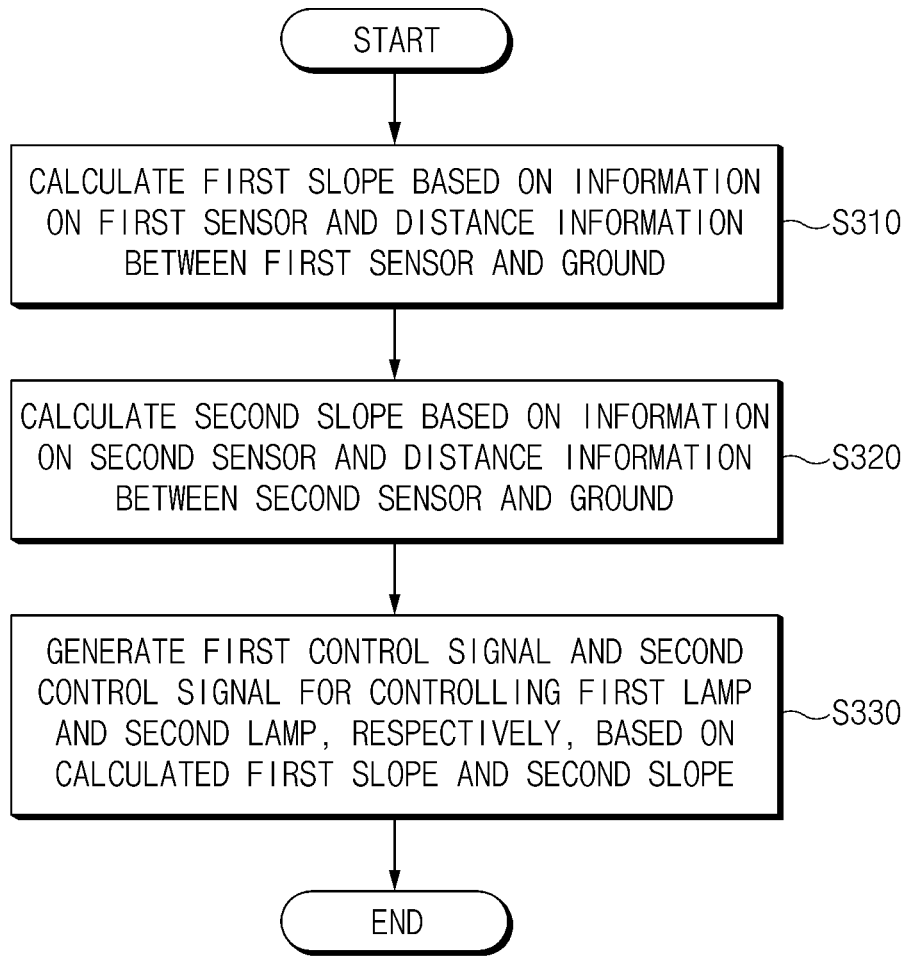

FIGS. 7 and 8 are flowcharts illustrating in more detail a method of operating a lamp control apparatus, according to an embodiment of the present disclosure.

Referring to FIG. 7, a method of operating the lamp control apparatus 100 according to an embodiment of the present disclosure may include calculating an irradiation angle of a sensor based on position information of the sensor and distance information between the sensor and the ground (S210), calculating a slope of the vehicle by comparing a reference irradiation angle information with the calculated irradiation angle of the sensor (S220), and generating a control signal for controlling the lamp to correct an irradiation angle of the lamp by the calculated slope of the vehicle (S230).

In S210 of calculating the irradiation angle of the sensor based on the position information of the sensor and the distance information between the sensor and the ground, the controller 120 may calculate the irradiation angle of the sensor based on the position information of the sensor and the distance information between the sensor and the ground. For example, the controller 120 may calculate a ratio of the position information of the sensor and the distance information between the sensor and the ground, and may calculate an irradiation angle of the sensor corresponding to the calculated ratio. As another example, the controller 120 may calculate the irradiation angle of the sensor based on the trigonometric function. In an embodiment, S210 may be included in S130 of FIG. 6.

In S220 of calculating the slope of the vehicle by comparing the reference irradiation angle information with the calculated irradiation angle of the sensor, the controller 120 may compare the reference irradiation angle information and the calculated irradiation angle of the sensor to calculate the slope of the vehicle. For example, the controller 120 may calculate a difference between the reference irradiation angle information regarding the irradiation angle of the sensor when the vehicle is horizontal to the ground and the calculated irradiation angle of the sensor, and may determine that the difference of the calculated irradiation angle is a slope of the vehicle. In an embodiment, S220 may be included in S130 of FIG. 6.

In S230 of generating a control signal for controlling the lamp to correct the irradiation angle of the lamp by the calculated slope of the vehicle, the controller 120 may generate a control signal for controlling the lamp to correct the irradiation angle of the lamp by the calculated slope of the vehicle. For example, since there is a possibility that the lamp may be raised or lowered when the vehicle is tilted, the controller 120 may generate a control signal allowing the lamp to be raised or lowered by the slope of the vehicle. In an embodiment, the control signal generated by the controller 120 may be transferred to a device for controlling the operation of the lamp, and the device for controlling the operation of the lamp may move the lamp up and down in response to the control signal. In an embodiment, S230 may be included in S140 of FIG. 6.

Referring to FIG. 8, an operation method of the lamp control apparatus 100 according to an embodiment of the present disclosure may include calculating a first slope based on information on a first sensor and distance information between the first sensor and the ground (S310), calculating a second slope based on information on the second sensor and distance information between the second sensor and the ground (S320), and generating a first control signal and a second control signal for controlling the first lamp and the second lamp, respectively, based on the calculated first slope and the second slope (S330).

In an embodiment, the lamp may include a first lamp and a second lamp, and the sensor may include a first sensor coupled or attached to the first lamp and a second sensor coupled or attached to the second lamp. For example, the first lamp may be a right headlamp of the vehicle, and the second lamp may be a left headlamp of the vehicle. That is, the information acquirer 110 may acquire information on the first sensor, distance information between the first sensor and the ground, information on the second sensor, and distance information between the second sensor and the ground (S110 and S120 of FIG. 6).

In S310 of calculating the first slope based on the information on the first sensor and the distance information between the first sensor and the ground, the controller 120 may calculate a first slope based on information on the first sensor and distance information between the first sensor and the ground. For example, the controller 120 may calculate the irradiation angle of the first sensor based on the position information of the first sensor and the distance information between the first sensor and the ground, and may calculate the first slope by comparing the irradiation angle of the first sensor with the reference irradiation angle information of the first sensor. In an embodiment, S310 may be included in S130 of FIG. 6.

In S320 of calculating the second slope based on the information on the second sensor and the distance information between the second sensor and the ground, the controller 120 may calculate a second slope based on information on the second sensor and distance information between the second sensor and the ground. For example, the controller 120 may calculate the irradiation angle of the second sensor based on the position information of the second sensor and the distance information between the second sensor and the ground, and may calculate the second slope by comparing the irradiation angle of the second sensor with the reference irradiation angle information of the second sensor. In an embodiment, S320 may be included in S130 of FIG. 6.

In S330 of generating a first control signal and a second control signal for controlling each of the first lamp and the second lamp based on the calculated first and second slopes, the controller 120 may generate a first control signal for controlling the first lamp based on the calculated first slope, and may generate a second control signal for controlling the second lamp based on the calculated second slope. For example, since the irradiating directions of the first lamp and the second lamp may be different depending on the respective slopes, the controller 120 may separately generate the first control signal for controlling the first lamp and the second control signal for controlling the second lamp.

According to an embodiment of the present disclosure, a lamp control apparatus may calculate a slope of the vehicle based on information on the sensor and information obtained from the sensor, and may generate a control signal for controlling a lamp to correct the irradiation angle of the lamp based on the calculated slope of the vehicle.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A lamp control apparatus comprising:
    an information acquirer configured to receive sensor information of a sensor of a vehicle, and to receive, from the sensor, a distance between the sensor and a ground on which the vehicle is positioned; and
    a controller configured to calculate a slope of the vehicle based on the sensor information and the distance between the sensor and the ground, and generate, based on the calculated slope of the vehicle, a control signal for controlling a lamp of the vehicle,
    wherein the sensor information includes a position of the sensor and a reference irradiation angle of the sensor while the vehicle is horizontal to the ground.

2. The lamp control apparatus of claim 1, wherein the controller is configured to calculate an irradiation angle of the sensor based on the position of the sensor and the distance between the sensor and the ground.

3. The lamp control apparatus of claim 2, wherein, to calculate the slope of the vehicle, the controller is configured to compare the reference irradiation angle and the calculated irradiation angle.

4. The lamp control apparatus of claim 1, wherein the control signal is configured to cause the lamp to correct the irradiation angle of the lamp based on the calculated slope of the vehicle.

5. The lamp control apparatus of claim 1, wherein the sensor has a first irradiation angle, and the lamp has a second irradiation angle different from the first irradiation angle.

6. A lamp control apparatus comprising:
    an information acquirer configured to receive sensor information of a sensor of a vehicle, and to receive, from the sensor, a distance between the sensor and a ground on which the vehicle is positioned; and
    a controller configured to calculate a slope of the vehicle based on the sensor information and the distance between the sensor and the ground, and generate, based on the calculated slope of the vehicle, a control signal for controlling a lamp of the vehicle,
    wherein the lamp includes a first lamp and a second lamp, and the sensor includes one or more sensors, each sensor coupled to one of the first lamp and the second lamp.

7. The lamp control apparatus of claim 6, wherein:
    the one or more sensors include a first sensor coupled to the first lamp and a second sensor coupled to the second lamp, and
    the controller is configured to:
        calculate a first slope based on first sensor information of the first sensor and a first distance between the first sensor and the ground, and
        calculate a second slope based on second sensor information of the second sensor and a second distance between the second sensor and the ground.

8. The lamp control apparatus of claim 7, wherein the controller is configured to:
    generate a first control signal for controlling the first lamp based on the calculated first slope; and
    generate a second control signal for controlling the second lamp based on the calculated second slope.

9. A method of operating a lamp control apparatus, comprising:
    receiving a distance between a sensor of a vehicle and a ground on which the vehicle is positioned;
    receiving sensor information of the sensor, the sensor information including a position of the sensor and a reference irradiation angle of the sensor while the vehicle is horizontal to the ground;
    calculating a slope of the vehicle based on the sensor information of the sensor and the distance between the sensor and the ground; and
    generating a control signal for controlling a lamp of the vehicle based on the calculated slope of the vehicle.

10. The method of claim 9, wherein calculating the slope of the vehicle includes:
    calculating an irradiation angle of the sensor based on the sensor information and the distance between the sensor and the ground; and
    comparing the reference irradiation angle and the calculated irradiation angle of the sensor.

11. The method of claim 9, wherein generating the control signal includes configuring the control signal to control the lamp to correct the irradiation angle of the lamp based on the calculated slope of the vehicle.

12. The method of claim 9, wherein:
    the lamp includes a first lamp and a second lamp, and
    the sensor includes a first sensor coupled to the first lamp and a second sensor coupled to the second lamp.

13. The method of claim 12, wherein calculating the slope of the vehicle includes:
    calculating a first slope based on first sensor information of the first sensor and a first distance between the first sensor and the ground; and
    calculating a second slope based on second sensor information of the second sensor and a second distance between the second sensor and the ground.

14. The method of claim 13, wherein generating the control signal includes:
    generating a first control signal for controlling the first lamp based on the calculated first slope; and
    generating a second control signal for controlling the second lamp based on the calculated second slope.

* * * * *